United States Patent
Ishii et al.

(10) Patent No.: US 8,744,831 B2
(45) Date of Patent: Jun. 3, 2014

(54) SIMULATION APPARATUS, SIMULATION METHOD AND RECORDING MEDIUM FOR RECORDING SIMULATION PROGRAM

(75) Inventors: Shogo Ishii, Tokyo (JP); Hidehisa Takamizawa, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 230 days.

(21) Appl. No.: 13/156,449

(22) Filed: Jun. 9, 2011

(65) Prior Publication Data

US 2011/0307236 A1 Dec. 15, 2011

(30) Foreign Application Priority Data

Jun. 10, 2010 (JP) ................................ 2010-132770

(51) Int. Cl.
    *G06F 17/50* (2006.01)
(52) U.S. Cl.
    USPC .............................. 703/14; 703/23; 716/106
(58) Field of Classification Search
    USPC ..................................................... 703/13, 14
    See application file for complete search history.

(56) References Cited

U.S. PATENT DOCUMENTS

| | | | |
|---|---|---|---|
| 6,230,114 B1* | 5/2001 | Hellestrand et al. | 703/13 |
| 6,389,379 B1* | 5/2002 | Lin et al. | 703/14 |
| 6,584,436 B2* | 6/2003 | Hellestrand et al. | 703/13 |
| 7,155,690 B2 | 12/2006 | Yamashita et al. | |
| 7,260,517 B2* | 8/2007 | Bailey et al. | 703/27 |
| 2002/0019969 A1* | 2/2002 | Hellestrand et al. | 716/5 |
| 2008/0281576 A1 | 11/2008 | Ohno et al. | |
| 2008/0288232 A1 | 11/2008 | Ishii et al. | |
| 2008/0288233 A1 | 11/2008 | Ishii et al. | |
| 2009/0024381 A1* | 1/2009 | Sakamoto et al. | 703/26 |
| 2009/0171652 A1 | 7/2009 | Ishii et al. | |

FOREIGN PATENT DOCUMENTS

| | | |
|---|---|---|
| JP | 2004-234528 | 8/2004 |
| JP | 2005-293219 | 10/2005 |
| JP | 2006-023852 | 1/2006 |
| JP | 2006-163983 | 6/2006 |
| JP | 2009-026113 | 2/2009 |

OTHER PUBLICATIONS

Yi et al, "Fast and Time-Accurate Cosimulation with OS Scheduler Modeling", Design Automation for Embedded Systems, 8, pp. 211-228, 2003.*

Cockx, Johan "Efficient Modeling of Preemption in a Virtual Prototype", IMEC, IEEE, 2000.*

* cited by examiner

*Primary Examiner* — Mary C Jacob

(74) *Attorney, Agent, or Firm* — Amin, Turocy & Watson, LLP

(57) ABSTRACT

According to one embodiment, a simulation apparatus includes a hardware model execution unit that executes a hardware model, a software model execution unit that executes a software model, a simulation time management unit that sets a first simulation time indicating a total elapsed time of a simulation time of the hardware model, ahead by the simulation time of which the HW model notified, and sets the second simulation time indicating a total elapsed time of a simulation time of the software model, ahead by the simulation time of which the SW model notified, and a scheduler that compares the first simulation time with the second simulation time, causes the SW model or the HW model to be executed based on the comparison result, and causes only the hardware model to be executed instead of execution of an idle loop when the SW model awaits an interrupt from the HW model.

5 Claims, 11 Drawing Sheets

FIG.2

| SW1: IDENTIFICATION INFORMATION OF SW MODEL 1 | $T_{SW1}$: SIMULATION TOTAL ELAPSED TIME OF SW MODEL 1 |
|---|---|
| SW2: IDENTIFICATION INFORMATION OF SW MODEL 2 | $T_{SW2}$: SIMULATION TOTAL ELAPSED TIME OF SW MODEL 2 |
| ⋮ | ⋮ |
| SWn: IDENTIFICATION INFORMATION OF SW MODEL n | $T_{SWn}$: SIMULATION TOTAL ELAPSED TIME OF SW MODEL n |
| HW1: IDENTIFICATION INFORMATION OF HW MODEL 1 | $T_{HW1}$: SIMULATION TOTAL ELAPSED TIME OF HW MODEL 1 |
| HW2: IDENTIFICATION INFORMATION OF HW MODEL 2 | $T_{HW2}$: SIMULATION TOTAL ELAPSED TIME OF HW MODEL 2 |
| ⋮ | ⋮ |
| HWn: IDENTIFICATION INFORMATION OF HW MODEL n | $T_{HWn}$: SIMULATION TOTAL ELAPSED TIME OF HW MODEL n |

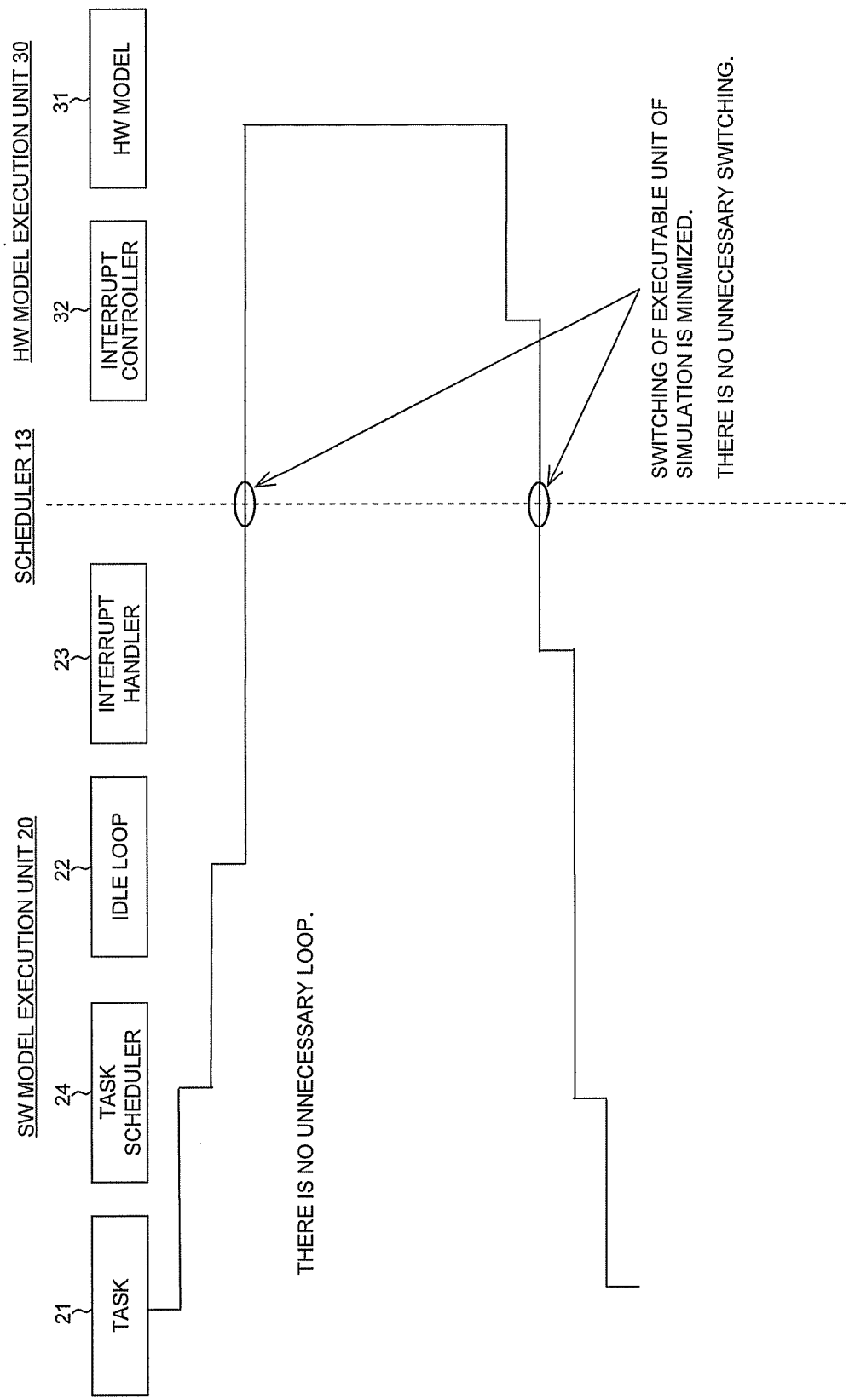

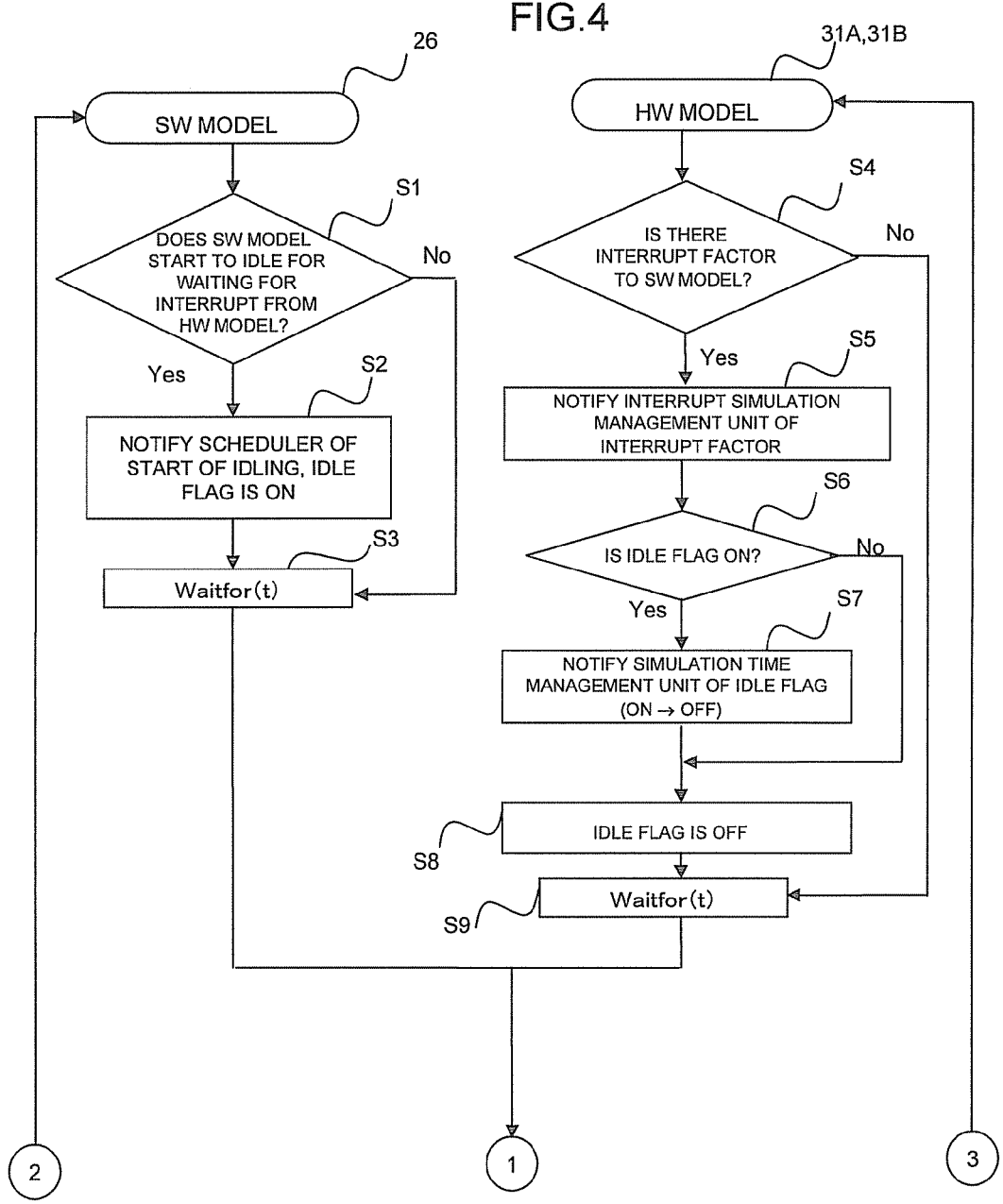

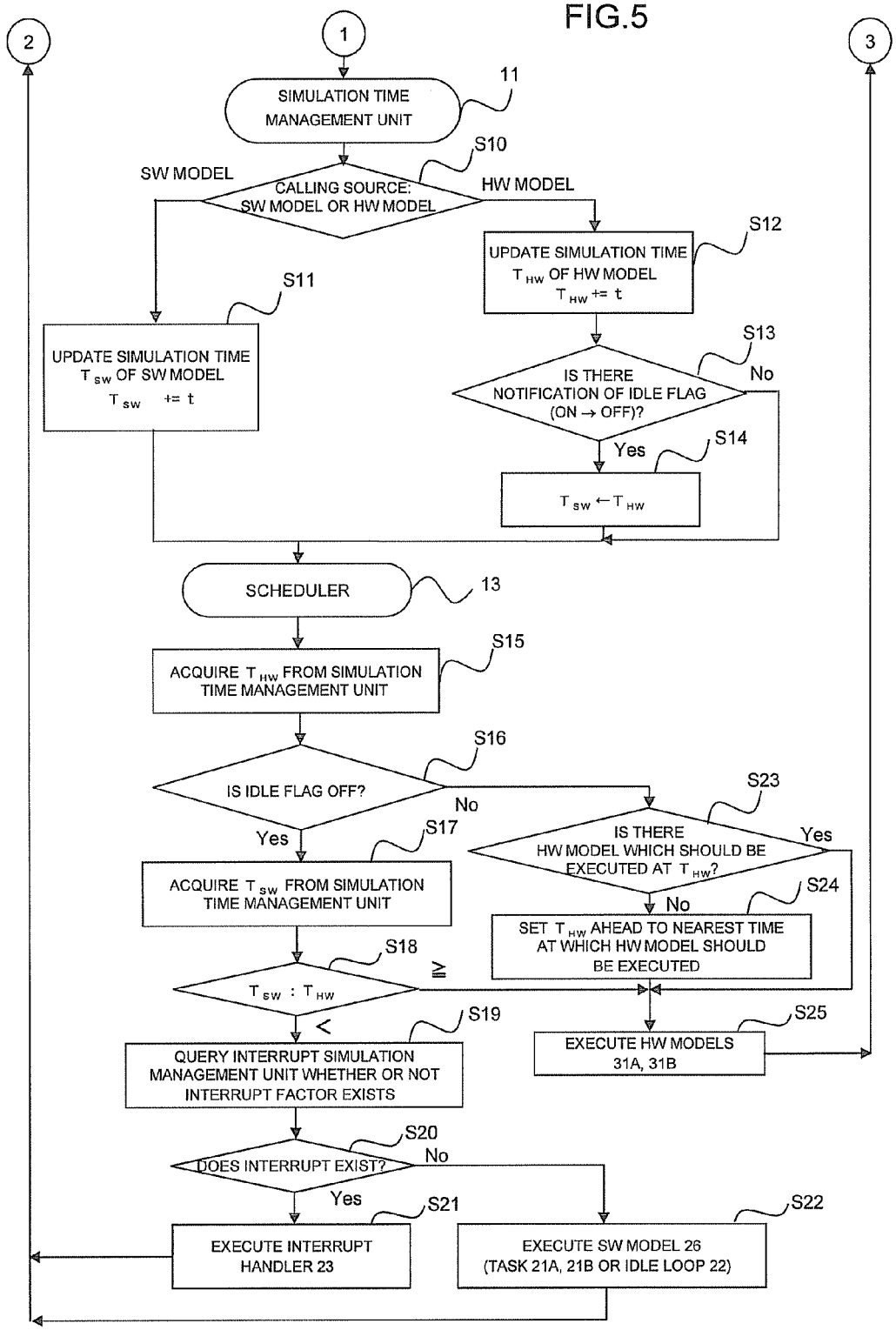

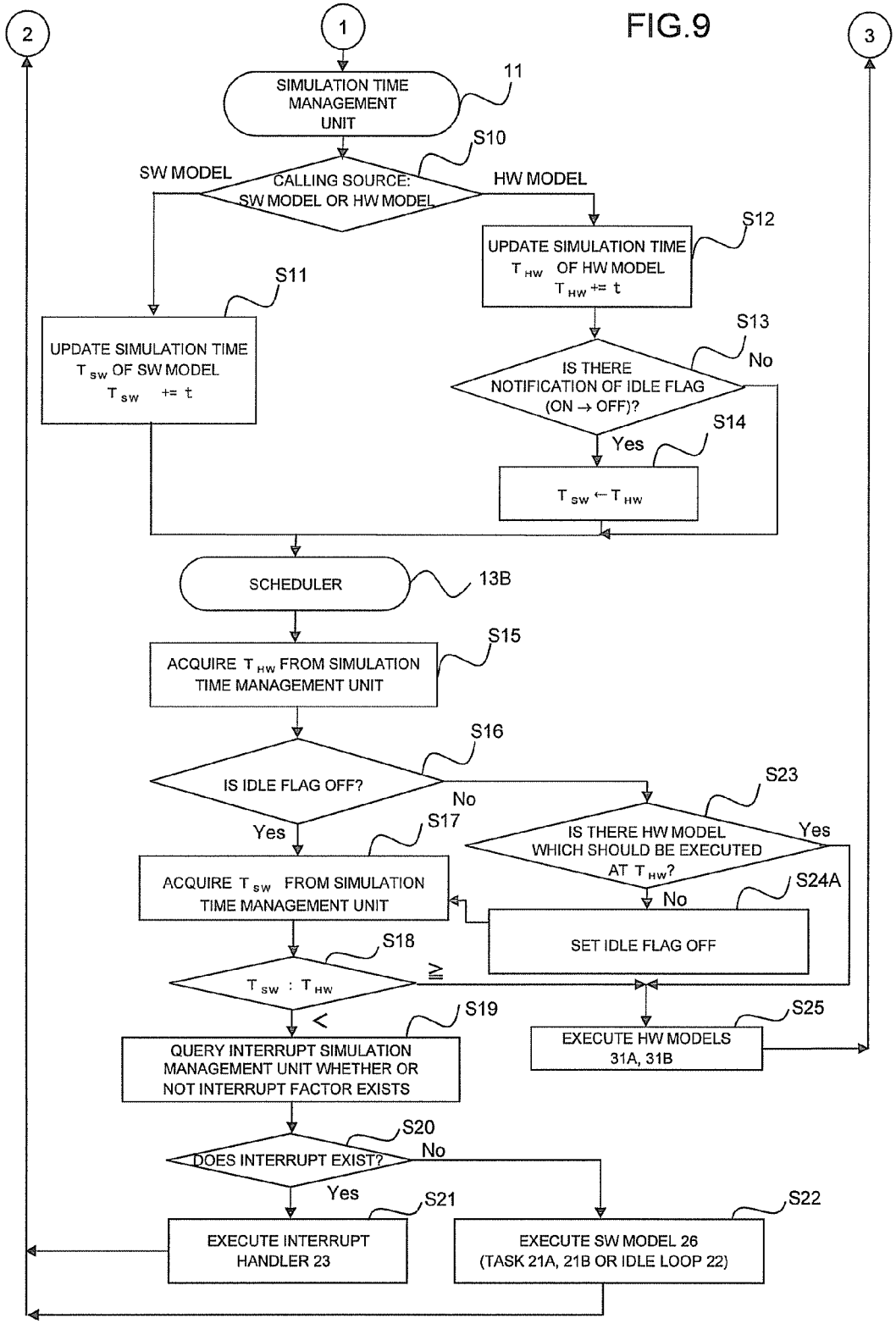

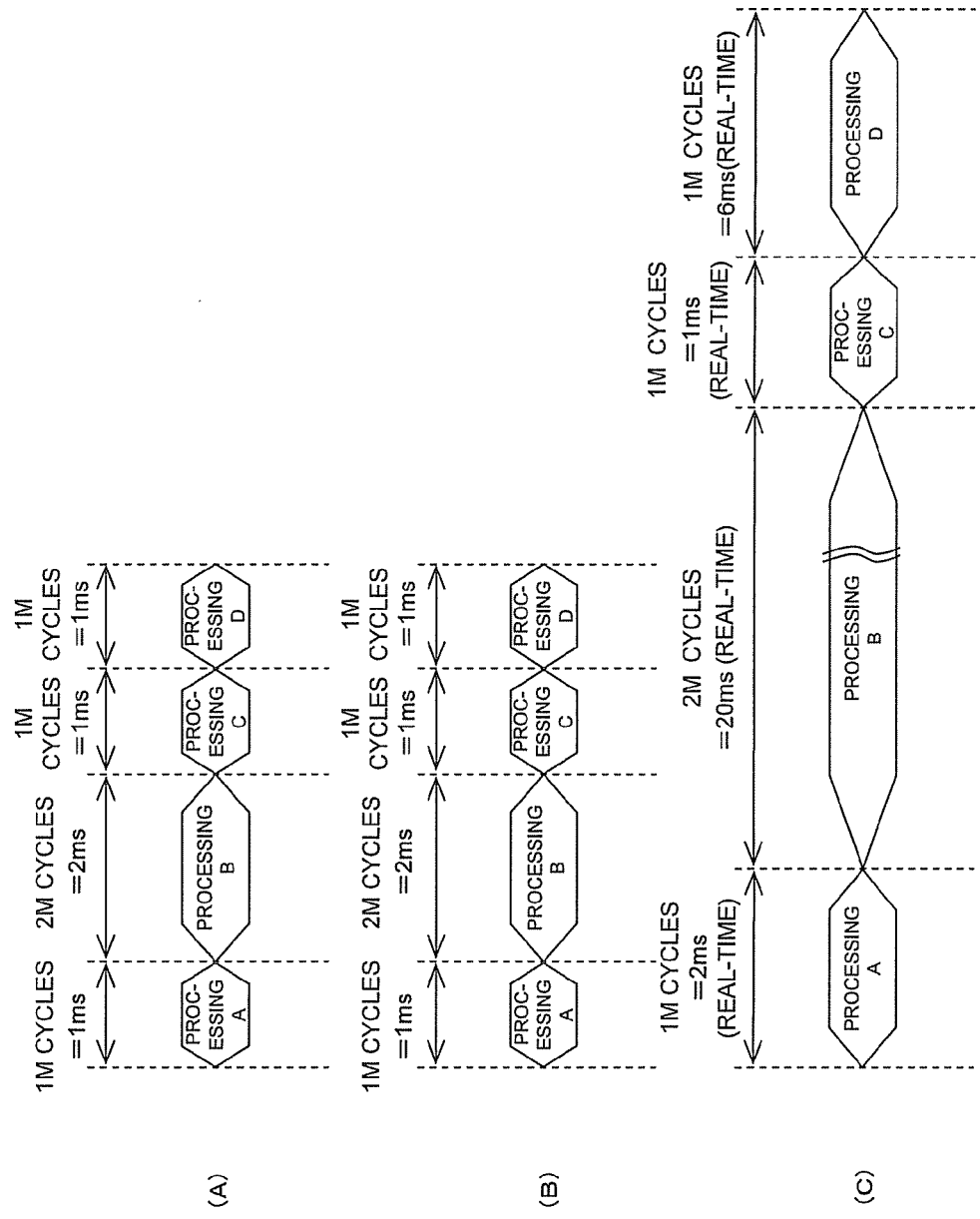

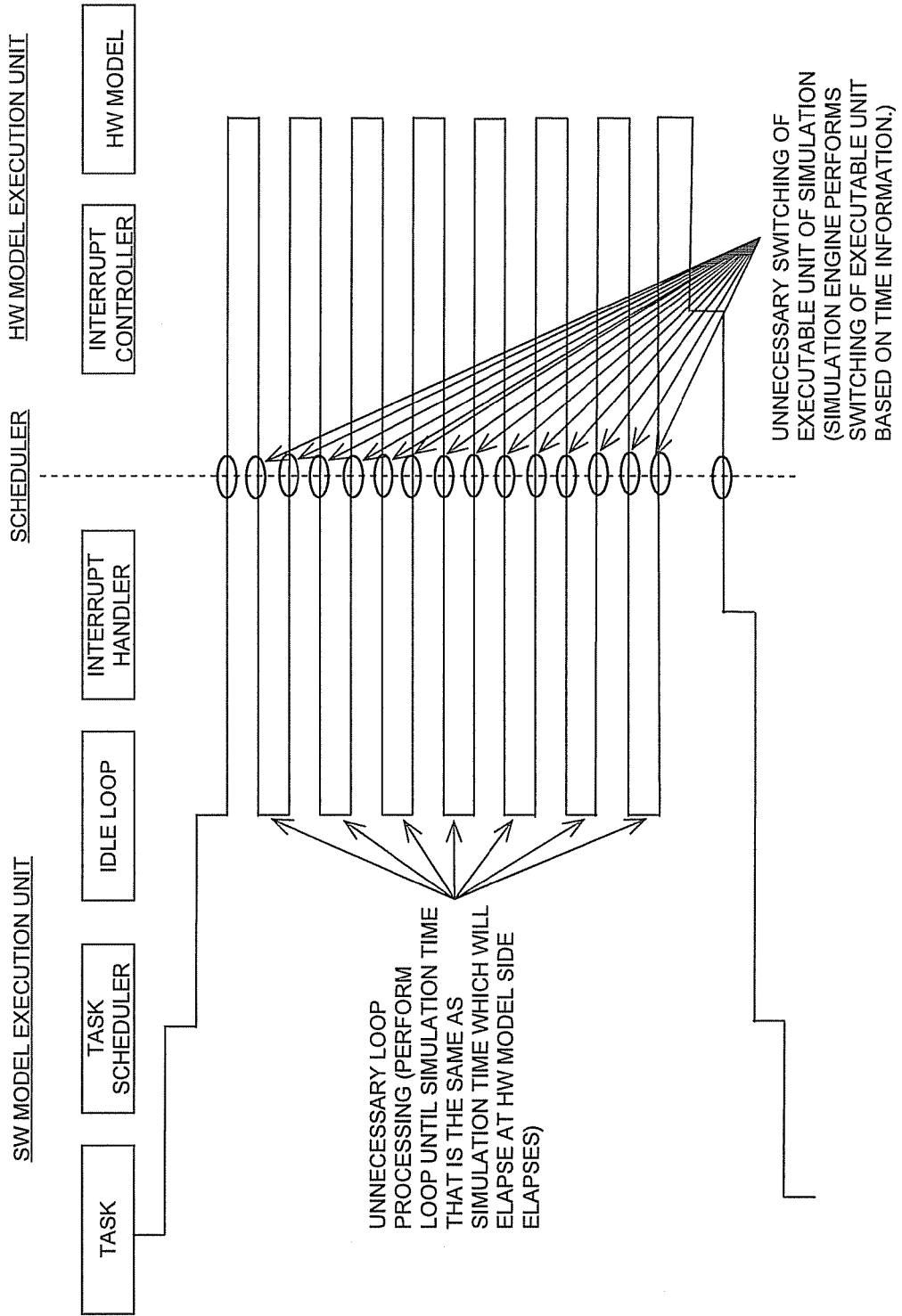

SIMULATION APPARATUS, SIMULATION METHOD AND RECORDING MEDIUM FOR RECORDING SIMULATION PROGRAM

CROSS-REFERENCE TO RELATED APPLICATION

This application is based upon and claims the benefit of priority from Japanese Patent Application No. 2010-132770, filed Jun. 10, 2010; the entire contents of which are incorporated herein by reference.

FIELD

Embodiments described herein relate generally to a simulation technique that simulates a device including software and hardware.

BACKGROUND

A simulation apparatus simulating a device that functions by cooperation between hardware and software is conventionally known. The simulation apparatus includes an HW (Hardware) model that simulates hardware processing and a SW (software) model that simulates software processing. The simulation apparatus performs the simulation by utilizing the HW model and the SW model. The simulation apparatus performs serial processing by the HW model and the SW model so as to implement parallel processing of a hardware component and a software component included in a simulation target device (hereafter refer to as an "actual device").

The simulation apparatus holds and manages time information as a simulation time for each of the HW model and the SW model in order to reproduce time elapsing and timing of the actual device.

The simulation time and elapsed time due to the computing by the simulation apparatus will be described with reference to FIG. 10. FIG. 10 (A) is a diagram showing an example of a time for each processing during actual operation of the actual device (or estimated time for each processing at the design stage). FIG. 10(B) is a diagram showing an example of the simulation time on the simulation apparatus. FIG. 10(C) is a diagram showing a time (hereafter refer to as a "real-time") for simulating each processing of the actual device by utilizing the simulation apparatus.

As to an example of a processing time of the actual device, a processing time of the processing A is 1 ms, a processing time of the processing B is 2 ms, the processing time of the processing C is 1 ms, and the processing time of the processing D is 1 ms as shown in FIG. 10(A). The simulation apparatus allowing for the simulation time manages times for each processing in the actual device as the simulation times. Then, the processing time and the simulation time have the same value as shown in FIGS. 10(A) and 10(B).

When the simulation apparatus simulates each processing of the actual device, the processing time for controlling hardware resources of the simulation apparatus and the processing time for software controlling occur. Consequently, the real-time extends beyond the processing time of the actual device as shown in FIG. 10(C), thereby developing a delay in each processing.

In the prior art, when the SW model is set in a state for awaiting an interrupt from the HW model, the simulation apparatus executes a loop for the wait processing (hereafter refer to as an "idle loop"). Namely, the simulation apparatus executing the simulation has to allocate the hardware resources to the processing relating to the idling state of the SW model. As a result, the execution speed of the simulation decreases.

In the conventional scheme, resources of the host computer are allocated to execution of a busy loop on the idle loop of an Operating System (OS). While a period of the simulation time elapses until an interrupt occurs, the host computer consumes the hardware resources more than necessary, thereby degrading the execution performance for the simulation.

A problem of the conventional technique will be described with reference to FIG. 11. FIG. 11 shows a transition in the case that a simulation engine simulates by switching executable units between the SW model and the HW model both in the idling state according to the simulation time.

The simulation system waits (the idle loop is executed) until the simulation time elapses by the same time of the simulation time which elapses in the HW model side, and reproduces time elapsing and timing of the simulation target. Hence, there is a problem in the conventional simulation system that the host Central Processing Unit (CPU) consumes resources more than necessary in order to execute the idle loop in the SW model as necessary There is also a problem in the simulation system that overhead of the simulation engine occurs for switching of the executable unit. The resource consumption of the host CPU and the switching of the executable unit degrade the execution performance of the simulation.

In the conventional simulation system including information of the simulation time, the executable unit of the SW model and the executable unit of the HW model operate in parallel while the same simulation time elapses. The SW model has to execute simulation by the time which is equal to the simulation time required for occurrence of an interrupt from the HW model. However, since there is no operable task except the idle loop in the SW model side, the idle loop executes the loop processing until the simulation time elapses.

In the simulation of the idling state, there is a method (real-time OS simulation method) of reducing the load on the Operating System (OS) in the idling state by switching between the process relative time timer function and the real-time timer function, as a method of avoiding unnecessary load on the host computer. However, in the method, it is necessary to simulate the idling state by utilizing resources of the host computer and the real-time should elapse.

BRIEF DESCRIPTION OF THE DRAWINGS

FIG. 2 is a diagram showing an example of a table used for managing correspondence relation between model identification information and a simulation time;

FIG. 3 is a diagram showing a transition of simulation execution of the first embodiment;

FIG. 4 is a flowchart showing an example of an operation of the simulation apparatus of the first embodiment (flowchart 1);

FIG. 5 is a flowchart showing an example of an operation of the simulation apparatus of the first embodiment (flowchart 2);

FIG. 9 is a flowchart showing an example of an operation of the simulation apparatus of the fourth embodiment (corresponds to FIG. 5);

FIGS. 10(A), 10(B) and 10(C) are diagrams for explanation of a simulation time and a real-time; and FIG. 11 is a diagram showing a transition of conventional simulation execution.

DETAILED DESCRIPTION

Figure 1:
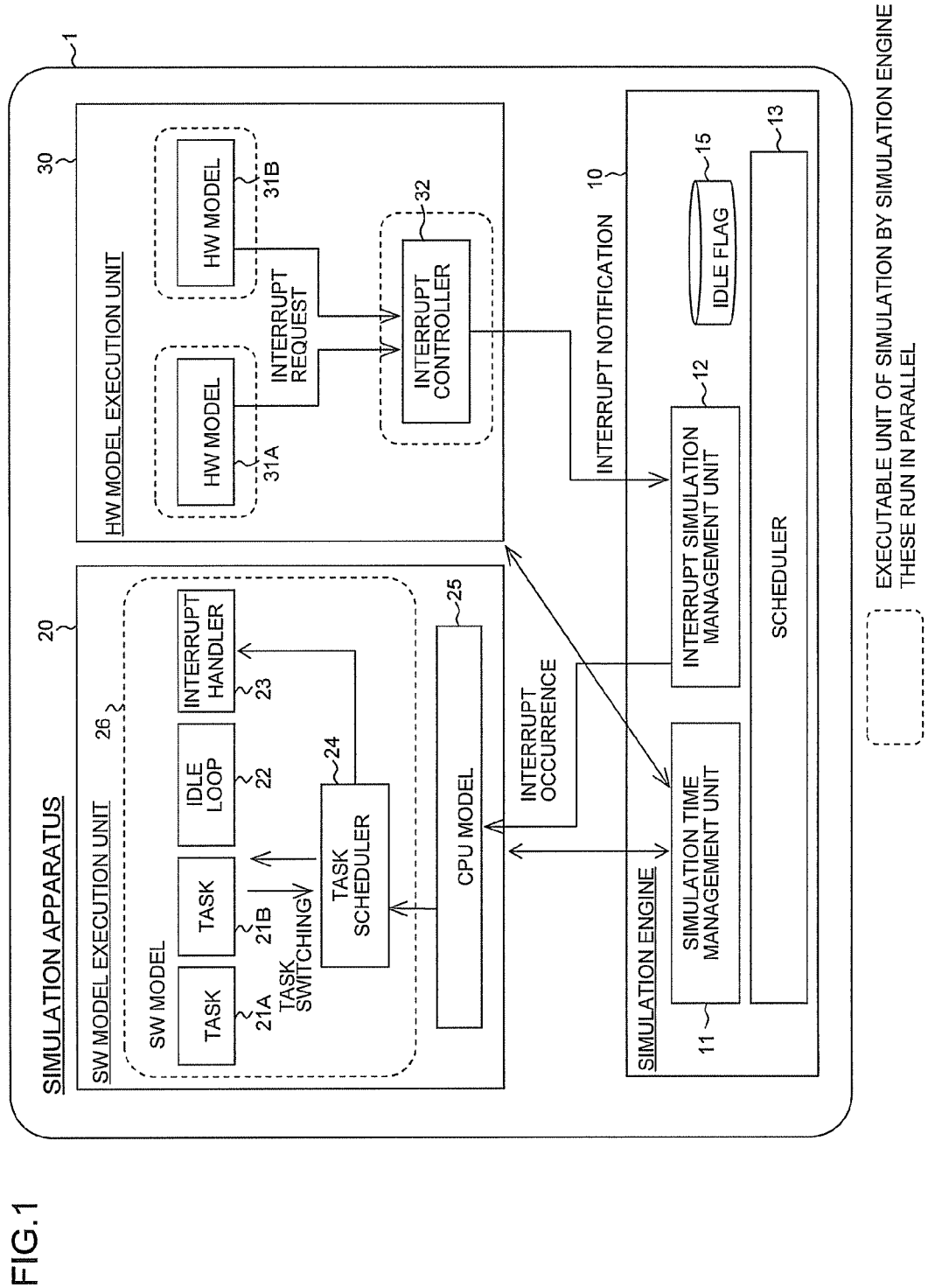
FIG. 1 is a block diagram showing an example of a functional configuration of a simulation apparatus of a first embodiment.

In general, according to one embodiment, a simulation apparatus manages a simulation time which indicates an elapsed time for executing processing by a verification target when the verification target performs hardware processing and software processing, and reproduces an execution timing of each processing by the verification target. The simulation apparatus includes a hardware model execution unit that executes a hardware model that simulates processing of hardware installed in the verification target and notifies of a simulation time indicating an elapsed time for processing by the hardware model. The simulation apparatus includes a software model execution unit that executes a software model that simulates processing of software installed in the verification target and notifies of a simulation time indicating an elapsed time for processing by the software model. The simulation apparatus includes a simulation time management unit that stores a first simulation time indicating a total elapsed time of the simulation time of the hardware model and a second simulation time indicating a total elapsed time of the simulation time of the software model, acquires the simulation time of which the hardware model notified so as to set the first simulation time ahead by the acquired simulation time, and acquires the simulation time of which the software model notified so as to set the second simulation time ahead by the acquired simulation time. The simulation apparatus includes an execution instruction unit that compares the first simulation time with the second simulation time, instructs the software model execution unit to execute the software model when the first simulation time is later than the second simulation time, and instructs the hardware model execution unit to execute the hardware model when the second simulation time is later than the first simulation time. The simulation apparatus includes an interrupt management unit that stores information that indicates whether or not an interrupt notification by the hardware model to the software model exists at present.

The execution instruction unit queries the interrupt management unit whether or not the interrupt notification exists, instructs the software model execution unit to execute an interrupt handler of the software model when the interrupt notification exists, and instructs the software model execution unit to execute a task of the software model when the interrupt notification does not exist. The execution instruction unit instructs, when the software model awaits an interrupt from the hardware model, the hardware model execution unit to execute only the hardware model instead of execution of an idle loop of the software model until the interrupt from the hardware model occurs, and sets the second simulation time ahead to the first simulation time when the interrupt from the hardware model occurs.

First Embodiment

A simulation apparatus of the first embodiment, when the apparatus is set to an idle state, does not execute a busy loop processing of a SW model and does sets a simulation time ahead by a time for occurrence of a next interrupt from a HW model. Therefore, the simulation apparatus of the first embodiment may enhance the speed of simulation execution without utilization of resources of a host computer.

FIG. 1 shows an example of functional blocks of the simulation apparatus of the first embodiment. The simulation apparatus 1 may be a computer which includes a central processing unit (CPU), a main storage, a nonvolatile memory device such as a hard disk derive and a flash memory, and the like as hardware resources.

The simulation apparatus 1 includes a simulation engine 10, a SW model execution unit 20 and a HW model execution unit 30. Each of the functional blocks may be implemented by loading a program which previously installed in a nonvolatile memory device in a main storage and executing it by using a CPU.

The SW model execution unit 20 simulates a software processing of a simulation target device (when the simulation apparatus 1 simulates a digital camera, the simulation target device is the digital camera. As described above, we refer to the simulation target device as an "actual device".). The SW model execution unit 20 includes a CPU model 25 which simulates a CPU of the actual device by software processing. The SW model execution unit 20 executes the SW model 26 so that the SW model 26 runs on the CPU model 25.

The SW model 26 is a program that is executed on the CPU model 25 (the program including an OS of the actual device). The SW model 26 simulates the software processing in the actual device and utilizes a simulation time updating means so as to notify a simulation time management unit 11 in the simulation engine 10 of a simulation time which indicates a time elapses by executing the processing, for each processing. The SW model is configured with program modules including a task 21A, a task 21B, an idle loop 22, an interrupt handler 23, and a task scheduler 24. The tasks 21A and 21B are programs for implementing functions of the SW model 26. The idle loop 22 is a program that is executed when the tasks 21A and 21B are not executed, in other words, when an idle state is simulated.

The task scheduler 24 is a module for switching programs of the task 21A, the task 21B and the idle loop 22, and for implementing a context switch which is a function for sharing a resource of the CPU model 25 by the tasks. The interrupt handler 23 is a program for executing previously defined processing when the HW model execution unit 30 issues an interrupt request.

The HW model execution unit 30 simulates operations of the hardware of the actual device by executing the HW models 31A and 31B, and the interrupt controller 32. The HW models 31A and 31B are programs for simulating each hardware of the actual device, such as an open/close control unit for a shutter, a Charged Coupled Device (CCD) image sensor if the actual device is a digital camera. The HW models 31A and 31B utilize a simulation time updating means so as to notify a simulation time management unit 11 in the simulation engine 10 of a simulation time which indicates a time elapses by executing the processing, for each processing. In order to install the HW models 31A and 31B a system level description language extending the C language is utilized. The HW models 31A and 31B output an interrupt request if necessary.

The interrupt controller 32 acquires the interrupt request output from the HW models 31A and 31B and transforms it into a format that indicates at least that which HW mode outputs the request to which SW model. Then, the interrupt controller 32 transmits an interrupt notification to the interrupt simulation management unit 12 of the simulation engine 10.

Note that the module surrounded by the broken line in FIG. 1 indicates an executable unit of the management control by the simulation engine 10. These ran in parallel.

The simulation engine 10 is a framework for managing data mutually used by the SW model execution unit 20 and the HW model execution unit 30 and for transmitting plural kinds of notification. In order to maintain that a simulation time of the SW model 26 is always equal to a simulation time of the HW models 31A and 31B, the simulation engine 10 updates each simulation time and switches execution of the executable unit. The simulation engine 10 includes program modules of the simulation time management unit 11, the interrupt simulation management unit 12 and a scheduler 13.

The simulation time management unit 11 executes the updating processing of the simulation time of the SW model 26 and the simulation time of each of the HW models 31A and 31B. The simulation time management unit 11 stores a total elapsed time (hereafter, refer to as a "first simulation time" if necessary) of the simulation time of each of the HW models 31A and 31B in the main storage. The simulation time management unit 11 also stores a total elapsed time (hereafter, refer to as a "second simulation time" if necessary) of the simulation time of the SW model 26 in the main storage. The simulation time management unit 11 acquires simulation times of which each of the HW models 31A and 31B notified, and sets the first simulation time ahead by adding the acquired simulation time to the first simulation time. The simulation time management unit 11 acquires a simulation time of which the SW model 26 notified and sets the second simulation time ahead by adding the acquired simulation time to the second simulation time.

When plural SW models exist, the simulation time management unit 11 manages a second simulation time of each of the plural SW models. Likewise, when the plural HW models exist, the simulation time management unit 11 manages a first simulation time of each of the plural HW models. The simulation time management unit 11 stores correspondence relation (table) between identification information and the total elapsed time of the simulation time of the SW model and the HW model, in the main storage of the simulation apparatus 1. The simulation time management unit 11 updates the table so as to manage the simulation time of each of the SW model and the HW model. FIG. 2 shows an example of the table for management of the correspondence relation between the model identification information and the simulation time.

The interrupt simulation management unit 12 acquires the interrupt notification by the HW model execution unit 30 and stores information indicating currently existing interrupt notification and which model notifies which model of the interrupt notification, in the main storage, thereby managing existence or nonexistence of the interrupt.

The scheduler 13 acquires the simulation times of SW model 26 and the HW models 31A and 31B from the simulation time management unit 11, determines which model should be executed, and sends instruction for execution to the determined model after the determination. The scheduler 13 compares the first simulation time with the second simulation time and instructs the SW model execution unit 20 to execute the SW mode 26 when the first simulation time is later than (is larger than) the second simulation time. On the other hand, when the second simulation time is later than (is larger than) the first simulation time, the scheduler 13 instructs the HW model execution unit 30 to execute one of the HW models 31A and 31B.

The scheduler 13 queries the interrupt simulation management unit 12 whether or not the interrupt notification exists, and instructs the SW model execution unit 20 to execute the interrupt handler 23 of the SW model 26 when the interrupt notification exists. On the other hand, when the interrupt notification does not exist, the scheduler 13 instructs the SW model execution unit 20 to execute the task 21A, the task 21B both of the SW model 26 or the idle loop 22.

Furthermore, the simulation engine 10 includes an idle flag 15 that indicates whether or not interrupt notification to the SW model 26 by the HW models 31A and 31B exists. The idle flag 15 is stored in the main storage or the nonvolatile memory device and is managed by the scheduler 13 of the simulation engine 10. The idle flag 15 is used to determine a model is in an idle state. An idle flag 15 is provided for every SW model 26. Note that the idle flag 15 may be disposed at various positions, for example, the idle flag 15 may be disposed in the interrupt simulation management unit 12. Another unit (such as the interrupt simulation management unit 12) may perform writing control, reading out control and management of the idle flag 15.

Next, interrupt notification by the HW model execution unit 30 to the SW model execution unit 20 in the simulation apparatus 1 will be described.

The HW model 31A or 31B requests the interrupt controller 32 to interrupt the SW model 26. The interrupt controller 32 notify the interrupt simulation management unit 12 of the simulation engine 10 that which HW model performs the interrupt request to which SW model. The interrupt simulation management unit 12 issues an interrupt to the SW model 26 via the CPU model 25 of the SW model execution unit 20. When the interrupt occurs, the task scheduler 24 of the SW model 26 interrupts task execution currently operating and executes the interrupt handler 23. After the processing of the interrupt handler 23 is completed, the task executed prior to the interrupt occurrence is resumed or the task scheduler 24 is executed and task switching processing is executed.

When the task 21A or 21B of the SW model 26 calls the task scheduler 24 and abandons the execution authority, the task scheduler 24 provides a task which has a highest priority at the current time with the execution authority. When there is no task which should be executed, the task scheduler 24 provides the idle loop 22 with the execution authority.

Next, the simulation time updating means will be described in detail. The simulation time updating means (waitfor function) is installed in the SW model 26 and the HW models 31A and 31B, and the models notify the simulation engine 10 of an elapse of the simulation time. The waitfor function as the simulation time updating means will be explained below. A function of waitfor(t) is a function for updating the simulation time. The function of waitfor(t) is also a function for instructing the simulation time management unit 11 to add an argument t to a total simulation time of the calling source (total amount of the current simulation time). For example, when the SW model calls waitfor(t), the simulation time management unit 11 adds an argument t to a total simulation time of the SW model 26. Likewise, when the HW model 31A, 31B calls waitfor(t), the simulation time management unit 11 adds the argument t to a total simulation time of the corresponding HW model 31A, 31B.

The scheduler 13 of the simulation engine 10 sets the executable unit which issues waitfor(t) in an execution wait state until the simulation time t elapses, and sets the executable unit in an executable state.

FIG. 3 shows a transition of the executable unit by the simulation apparatus 1. In the SW model 26, a simulation time elapses to the time of interrupt occurrence, instead of performing the loop processing by the idle loop 22 shown in FIG. 11. Then, the simulation apparatus 1 executes only the HW model until the simulation time of the HW model side elapses. Therefore, an unnecessary loop is eliminated, the switching of the executable unit is minimized, and unnecessary switching is eliminated.

Next, an operation of the simulation apparatus 1 will be described with reference to the flowcharts shown in FIGS. 4 and 5.

When the SW model 26 which is an executable unit of the SW model execution unit 20 idles for awaiting an interrupt from the HW model 31A, 31B (S1, Yes), the SW model 26 notifies the scheduler 13 of the idling and sets the idle flag 150N (S2). When the idling is not performed (S1, No), the process proceeds to step S3. The SW model 26 calls the waitfor function as the simulation time updating means (S3) in order to set the simulation time ahead by t.

On the other hand, when an interrupt factor to the SW model 26 exists (S4, Yes), the HW model 31A, 31B which is the executable unit of the interrupt occurrence 30 notifies the interrupt simulation management unit 12 of the interrupt factor (S5) and causes the scheduler 13 to set the idle flag 15 OFF. When the idle flag 15 is still ON (ON state) at S2 (S6, Yes), the HW model 31A, 31B notifies the simulation time management unit 11 of a change of the idle flag 15 from ON to OFF (S7). The idle flag 15 is set in the OFF state (S8). On the other hand, when the idle flag is OFF (S6, No), the current OFF state is maintained (S8).

When an interrupt factor to the SW model 26 does not exist (S4, No), the process proceeds to S9. The HW model 31A, 31B calls the waitfor function as the simulation time updating means in order to set the simulation time ahead by t (S9).

The simulation time management unit 11 identifies a calling source for the waitfor function (S10). When the calling source is the SW model 26 (S10, SW model), the simulation time management unit 11 updates the current total simulation time $T_{SW}$ of the SW model 26 by adding t to the current total simulation time $T_{SW}$ (S11). When the calling source is the HW model 31A, 31B (S10, HW model), the simulation time management unit 11 updates the simulation time of the HW model by adding t to the current total simulation time $T_{HW}$ of the HW model 31A, 31B (S12). When the simulation time management unit 11 does not receive the notification which indicates the change of the idle flag 15 from ON to OFF, from the HW model 31A, 31B (S13, No), the process proceeds to S15. When the simulation time management unit 11 receives the notification which indicates the change of the idle flag 15 from ON to OFF (S13, Yes), the simulation time management unit 11 changes the current total simulation time $T_{SW}$ of the SW model 26 to the to the current total simulation time $T_{HW}$ of the HW model 31A, 31B (S14).

A process in Step 14 will be described. Since the HW model 31A, 31B is executed only during the idling period (refer to S25), the total simulation time $T_{SW}$ of the SW model 26 is not updated. When such state goes on, only the total simulation time $T_{HW}$ of the HW model 31A, 31B is updated, and the synchronization between the SW model 26 and the HW model 31A, 31B may not be achieved. Hence, as described above, the setting the total simulation time $T_{SW}$ ahead by utilizing the total simulation time $T_{HW}$ of the HW model 31A, 31B, is performed.

The scheduler 13 acquires $T_{HW}$ from the simulation time management unit 11 (S15) and determines the state of the idle flag 15 (S16). When the idle flag 15 is OFF (S16, Yes), the scheduler 13 acquires $T_{SW}$ from simulation time management unit 11 (S17). The scheduler 13 compares the acquired $T_{SW}$ with the acquired $T_{HW}$, and, when a condition that $T_{SW} \geq T_{HW}$ is met (S18, "≥"), the scheduler 13 performs an execution instruction for the HW model (S25) and the process returns to S4. On the other hand, when a condition that $T_{SW} < T_{HW}$ is met (S18, "<"), the scheduler 13 queries the interrupt simulation management unit 12 whether or not there is an interrupt factor (S19).

When the interrupt factor is absent (S20, No), the task 21A, the task 21 or the idle loop 23 of the SW model 26 is executed (S22). When the interrupt factor is present (S20, Yes), the interrupt handler 23 is executed (S21). After Step S21 or S22, the process returns to 51.

When the idle flag 15 is ON (S16, No) in the determination processing at the Step S16, the scheduler 13 determines whether or not there is an HW model which should be executed at $T_{HW}$ (S23). When the HW model which should be executed is absent (S23, No), the scheduler 13 sets $T_{HW}$ ahead to the total simulation time of the HW model which will be executed at the nearest time (S24) and performs an execution instruction for the HW model (S25). When the HW model which should be executed is present (S23, Yes), the process proceeds to Step S25.

The operation example shown in FIGS. 4 and 5 may be applied to the case that the number of the models is equal to or larger than three. In the determination processing in Step S18, an equal sign may be given to either of the determination results according to the installation policy of the scheduler.

The waitfor function indicated in the first embodiment is an example of the simulation time updating means, and is applied to the case that the HW model or the SW model is described by the system level description language extending the C language, such as SystemC or SpecC. Therefore, the simulation time updating means in the first embodiment is not limited to the waitfor function.

From the foregoing description, since the simulation time is managed and only the HW model is executed when the SW model idles, an unnecessary loop is eliminated, and the switching of the executable unit is minimized. Time elapsing and timing of the actual device may be reproduced without degradation of reproduction accuracy.

Second Embodiment

As one type of the target device (actual device) which the simulation apparatus simulates, there is a device that monitors a change of status of hardware by polling the hardware from driver software. A simulation apparatus to which such driver software is installed will be described in a second embodiment.

Figure 6:
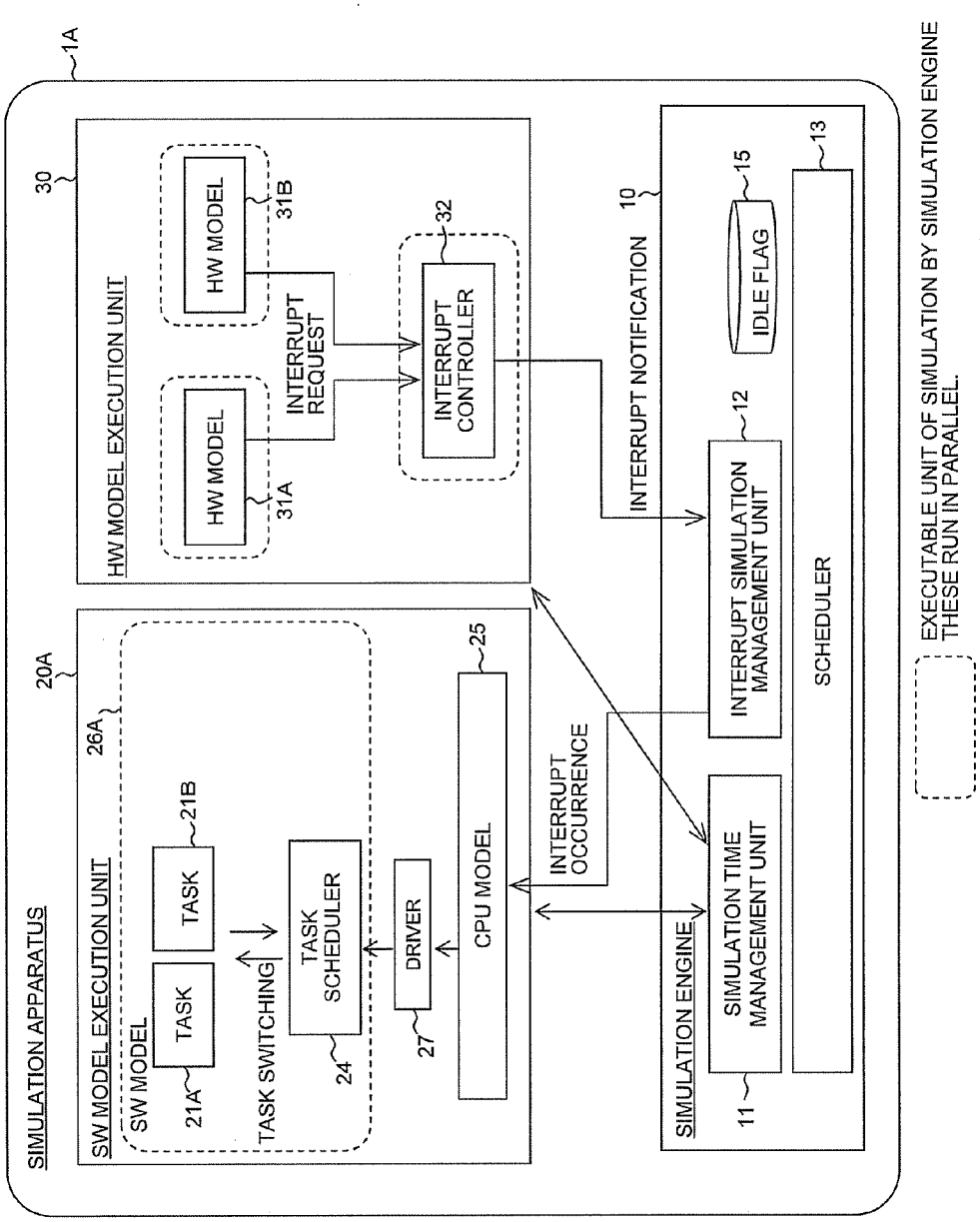
FIG. 6 is a block diagram showing an example of a functional configuration of a simulation apparatus of a second embodiment.

FIG. 6 is a diagram showing an example of the configuration of a simulation apparatus of the second embodiment. A simulation apparatus 1A includes a SW model 26A that includes a task 21A, a task 21B and a task scheduler 24. The simulation apparatus 1A includes a driver 27 that polls an HW model 31A, 31B and monitors a change of status of the HW model 31A, 31B. In FIG. 6, a unit to which the same reference numerals or letters in FIG. 1 are assigned, is the same in the first embodiment and the description of the unit is omitted.

Figure 7:
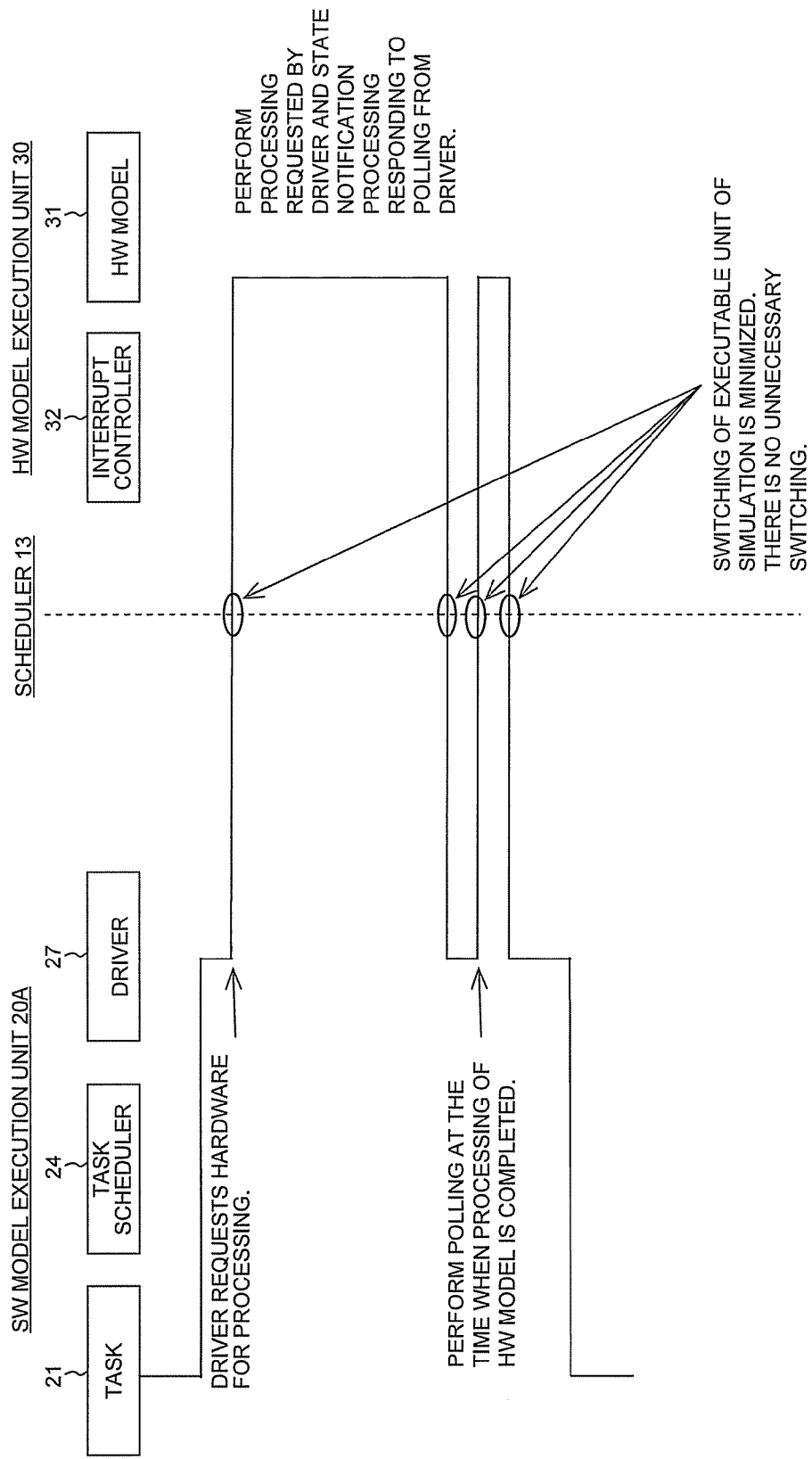
FIG. 7 is a diagram showing a transition of simulation execution of the second embodiment.

FIG. 7 is a diagram showing an example of a transition of simulation execution in the second embodiment. The driver 27 polls the HW model at the time of completion of the processing of the HW model 31A, 31B. The HW model 31A, 31B executes the processing requested by the driver 27 and the status notification processing responding to the polling from the driver 27. The simulation apparatus 1A operates as the same way of the simulation apparatus 1 in the first embodiment except the polling processing at the end of processing.

Third Embodiment

The case that an actual device is a non-OS type will be described in a third embodiment. When the actual device includes an OS, busy loop processing of an idle loop task of the OS is an improvement target for speeding up. An example of the non-OS type actual device which is speeded up will be described in the third embodiment.

In software of the non-OS type, a busy loop may be executed for awaiting passage of time for matching timing with an external. In the third embodiment, simulation of the busy loop processing is speeded up.

The loop processing applied to the embodiment should be a loop processing that does not produce side effects outside the loop. At the time of starting the loop processing, the idle loop starting notification of the first embodiment is performed.

In order to extract source code of the loop processing that does not produce side effects outside the loop from verification target software, and insert the idle loop starting notification processing, a preprocessor of a compiler may be utilized. However, a position may be instructed from the external to the simulation apparatus since there are not many loop positions for looping for a relatively long period generally.

For example, since the busy loop of the idle loop task of the OS is almost positioned at a single position of the verification target software, it is not necessary to automatically extract it by a program.

Fourth Embodiment

In the first embodiment, when a digital clock is simulated, the simulation apparatus executes the following processes.
1. Awaiting passage of time (idling)
2. Generating a timer interrupt after the passage of time
3. Updating time display based on software control Since an HW model (a timer in the present example) is absent at the process 1, in the first embodiment, a time of the HW model is set advance to a nearest time at which the HW model should operate, and the process 2 is immediately executed. In this case, the time of the clock is successively updated. The operation allows high-speed simulation and desired simulation may be implemented.

For example, when a calculator is simulated, a key input arbitrarily occurring (an operation of an external (outside) of a simulation apparatus) becomes a main event, displaying a result of calculating responding to the key input is target processing. When the calculator which is powered off after a predetermined period elapses in a state that the key input is absent, is simulated, the power-on state is immediately changed to the power-off state in the example of the first embodiment, and desired simulation is not expected.

When the simulation apparatus of the fourth embodiment is set in an idling state, the simulation apparatus does not execute the busy loop processing of the SW model when the HW model which should be executed is present, and execute only the HW model until a next interrupt from the HW model occurs. Therefore, a resource of the host computer is not utilized for the unnecessary busy loop processing and execution of the simulation is speeded up.

Figure 8:
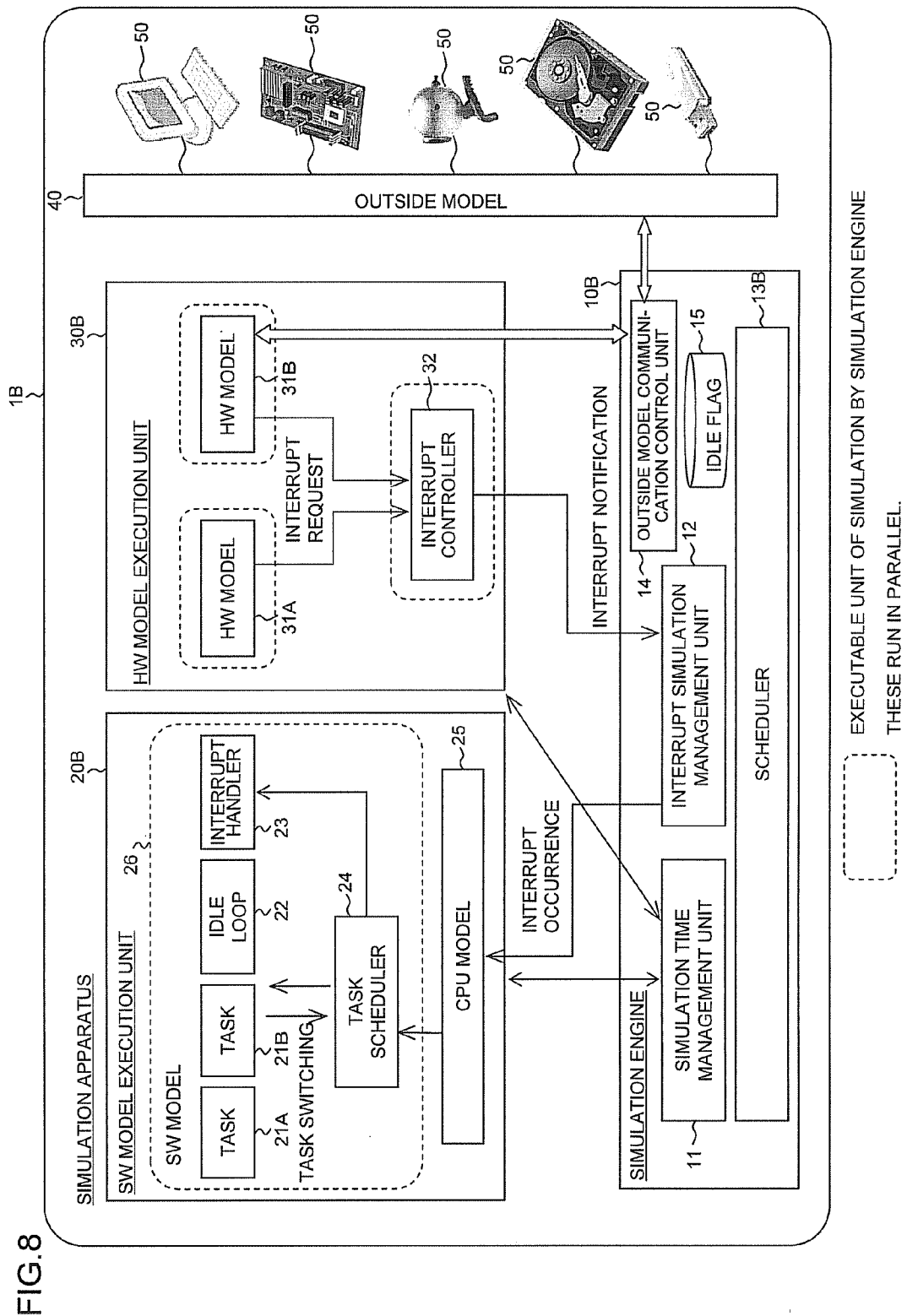
FIG. 8 is a block diagram showing an example of a functional configuration of a simulation apparatus of a fourth embodiment.

FIG. 8 shows an example of the configuration blocks of the simulation apparatus of the fourth embodiment. The simulation apparatus 1B is a computer that includes a CPU, a main storage, a nonvolatile memory device such as a hard disk derive and a flash memory, and the like as hardware resources.

The fourth embodiment differs from the first embodiment in that an outside model 40, an outside model communication control unit 14 and devices 50 are provided. In FIG. 8, a unit to which the same reference numerals or letters in FIG. 1 are assigned, is the same in the first embodiment.

The simulation apparatus 1B includes a simulation engine 10B, a SW model execution unit 20B, an HW model execution unit 30B and an outside model 40. Each of the functional blocks may be implemented by loading a program which previously installed in a nonvolatile memory device in a main storage and executing it by using a CPU.

The SW model execution unit 20B and the HW model execution unit 30B operate under the control of the simulation engine 10B. On the other hand, the outside model 40 operates independently of the simulation engine 10B and operates in parallel with the simulation engine 10B. The outside model 40 interactively communicates with the HW model via the outside model communication control unit 14 of the simulation engine 10B.

The outside model 40 is a program which performs input/output processing with the device 50 (such as a CPU board, a touch panel, a display, a keyboard, a mouse, a camera, a hard disk drive or a Universal Serial Bus (USB) connection memory device) that are internally or externally connected to the simulation apparatus 1B, and communicates with the simulation engine 10B. The outside model 40 is a program module directly operating in the CPU of the host computer.

The outside model communication control unit 14 is a program module that controls one-way communication or bidirectional communication between the HW model 31A, 31B and the outside model 40.

When the outside model 40 notifies the outside model communication control unit 14 of a request of data transmitting/receiving, the outside model communication control unit 14 instructs the scheduler 13B to perform the data transmitting/receiving processing of the HW model 31A or 31B. The scheduler 13B does not depend on schedule time information held by the simulation time management unit 11 and do perform the data transmitting/receiving processing of the HW model 31A or 31B. Therefore, the communication between the HW model and the outside model 40 is established.

When the HW model 31A or 31B notifies the outside model communication control unit 14 of a request of data transmitting/receiving, the outside model communication control unit 14 communicates with the outside model 40 by the interprocess communication. Therefore, the communication between the HW model and the outside model 40 is established.

Next, an operation of the simulation apparatus 1B will be described with reference to a flowchart of FIG. 9. FIG. 9 is a flowchart corresponding to FIG. 5 described in the first embodiment. The simulation apparatus 1B performs each process shown in FIG. 4 and then performs each process shown in FIG. 9. After the simulation apparatus 1B performs each process shown in FIG. 9, the process returns to a process shown in FIG. 4. Since a process to which the same reference numerals or letters in FIGS. 4 and 5 are assigned, is the same in the first embodiment, the step different from that of the first embodiment will be mainly described hereafter.

The scheduler 13B acquires $T_{HW}$ from the simulation time management unit 11 (S15). The scheduler 13B determines the state of the idle flag 15 (S16). When the idle flag 15 is ON (S16, No), the scheduler 13B determines whether or not there is an HW model which should be executed at $T_{HW}$ (S23).

When the HW model which should be executed is present (S23, Yes), the scheduler 13B performs an execution instruction for the HW model (S25), then the process returns to Step S4. When the HW model which should be executed is absent (S23, No), the scheduler 13B resets the idle flag 15 to OFF (S24A), and continues the normal scheduling processing (proceed to S17). In the first embodiment, it is not determined whether or not the HW model which should be executed at the nearest time, is executed at the simulation time $T_{HW}$, and the HW model which should be executed at the nearest time is executed, or, simulation time $T_{HW}$ is set ahead to the nearest time at which the HW model should be executed and the HW model is executed when there is not an HW model which should be executed at the simulation time $T_{HW}$. This processing differs from the processing of the fourth embodiment. The absence of an HW model which should be executed means the absence of an executable HW model.

In a simulation apparatus that does not include an outside model, an HW model which should be executed at the nearest time must exist when the SW model idles in order to await an interrupt from an HW model. When an HW model is absent, the idling of the SW model is continued forever. This implies that there is a bug in the HW model or the SW model, and when an HW model which should be executed at the nearest time is absent, the simulation apparatus may determine to detect a bug in the verification target SW model or HW model and stop the simulation.

On the other hand, in a simulation apparatus including an outside model, in the case that the SW model idles in order to await an interrupt from an HW model, even when an executable HW model is absent at the time, an HW model is set in the executable state because of the occurrence of communication from the outside model after a time elapses. Hence, it is necessary to continue the simulation.

According to the fourth embodiment, in the case that the SW model idles to await an interrupt from the HW model, it is possible to wait for event occurrence that sets the HW model in the executable state while the busy loop processing of the idle loop is forwarded by a simulation unit time when an HW model which should be executed is absent. When the HW mode which should be executed is present, only the HW model is executed, thereby eliminating unnecessary loop processing and minimizing the switching of the executable unit. Time elapsing and timing of the actual device may be reproduced without degradation of reproduction accuracy.

In the case that a target processor supports an idle mode (sleep mode), the OS does not execute the busy loop by the idle loop when the OS moves to the idling state, the OS sets the processor in the idle mode. The processor changes from the idle mode to a normal mode in response to an interrupt from the hardware.

Any of the embodiments may be applied to the case that the target processor supports the idle mode, and performance of the simulation may be increased for example, the speed of the simulation is enhanced. The increase of the performance is implemented by advancing the simulation time of the SW model by a period from the current time to the time of that an interrupt from the HW model occurs, instead of setting the processor in the idle mode.

From the foregoing description, in the first embodiment, a simulation apparatus 1 that manages a simulation time which indicates an elapsed time for executing processing by a verification target when the verification target performs hardware processing and software processing, and reproduces an execution timing of each processing by the verification target, is disclosed. The simulation apparatus 1 includes a hardware model execution unit 30 that executes a hardware model that simulates processing of hardware installed in the verification target and notifies of a simulation time indicating an elapsed time for processing by the hardware model, and a software model execution unit 20 that executes a software model that simulates processing of software installed in the verification target and notifies of a simulation time indicating an elapsed time for processing by the software model.

The simulation apparatus 1 of the first embodiment includes a simulation time management unit 11 that stores a first simulation time indicating a total elapsed time of the simulation time of the hardware model and a second simulation time indicating a total elapsed time of the simulation time of the software model, acquires the simulation time of which the hardware model notified so as to set the first simulation time ahead by the acquired simulation time, and acquires the simulation time of which the software model notified so as to set the second simulation time ahead by the acquired simulation time, a scheduler 13 that compares the first simulation time with the second simulation time, instructs the software model execution unit 20 to execute the software model when the first simulation time is later than the second simulation time, and instructs the hardware model execution unit 30 to execute the hardware model when the second simulation time is later than the first simulation time, and an interrupt simulation management unit 12 that stores information that indicates whether or not an interrupt notification by the hardware model to the software model exists at present.

The scheduler 13 of the first embodiment queries the interrupt simulation management unit 12 whether or not the interrupt notification exists, instructs the software model execution unit 20 to execute an interrupt handler of the software model when the interrupt notification exists, and instructs the software model execution unit 20 to execute a task of the software model when the interrupt notification does not exist.

In the simulation apparatus 1 of the first embodiment, when the software model awaits an interrupt from the hardware model (Step S1, Yes to Step S2), only the hardware model is executed instead of execution of an idle loop of the software model until the interrupt from the hardware model occurs. In other words, only the HW model is executed when the idle flag 15 is ON at Step S16, an interrupt factor occurs on the processes of Step S4, Yes to S5, and then only the HW model is executed until the idle flag 15 is set OFF without execution of the SW model (idle loop).

The simulation apparatus 1 sets the second simulation time ahead to the first simulation time when the interrupt from the hardware model occurs (Step S4, Yes). In other words, the process of Step S14 is conducted.

The simulation apparatus 1B disclosed in the fourth embodiment, includes an outside model 40 that is a program that performs input/output processing with a device connected to the simulation apparatus 1B and communicates with a simulation engine, the outside model 40 being directly executed by a CPU of the simulation apparatus 1B, and an outside model communication control unit 14 that controls one-way communication or bidirectional communication between the hardware model and the outside model 40.

The simulation apparatus 1B disclosed in the fourth embodiment, when the software model awaits an interrupt from the hardware model (Step S1, Yes to Step S2) and an executable hardware model exists (Step S23, Yes), causes only the executable hardware model to be executed instead of execution of an idle loop of the software model until the interrupt from the hardware model occurs. In other words, only the HW model is executed when the result of Step S23 is Yes.

The simulation apparatus 1B disclosed in the fourth embodiment, when an executable hardware model does not exist, executes the idle loop until the hardware model becomes executable. In other words, the SW model (idle loop 22) is executed when the result of Step S23 is No. When execution of the idle loop 22 is continued, the idle flag 15 which has been set OFF at Step S24A is set ON again at Step S2.

The simulation apparatus 1B of the fourth embodiment, causes, when the hardware model becomes executable (Step S23, Yes), only the executable hardware model to be executed (Step S25) instead of execution of the idle loop of the software model, and sets the second simulation time ahead to the first simulation time (Step S14) when the interrupt from the hardware model occurs (Step S4, Yes).

It is possible to provide as a simulation program a program that allows a computer to execute processes shown in the flowcharts or steps in the above embodiments. The program may be stored a computer-readable recording medium mentioned including a portable recording medium such as a CD-ROM, a flexible disk, a DVD disk, a magneto-optical disk, or an IC card, and a database, thereby allowing the computer to execute the program.

According to the above-explained embodiments, an unnecessary loop is eliminated and the switching of the executable unit is minimized. Therefore, the execution period in the simulation apparatus is shortened, and the speed of the simulation is enhanced without degradation of reproduction accuracy of time elapsing and timing of an actual device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A simulation apparatus that manages a simulation time which indicates an elapsed time for executing processing by a verification target when the verification target performs hardware processing and software processing, and reproduces an execution timing of each processing by the verification target, the simulation apparatus comprising:

a hardware model execution unit that executes a hardware model that simulates processing of hardware installed in the verification target and notifies of a hardware simulation time indicating an elapsed time for processing by the hardware model;

a software model execution unit that executes a software model that simulates processing of software installed in the verification target and notifies of a software simulation time indicating an elapsed time for processing by the software model;

a simulation time management unit that stores a first simulation time indicating a total elapsed time of the hardware simulation time and a second simulation time indicating a total elapsed time of the software simulation time, acquires the hardware simulation time whenever the hardware model notifies the hardware simulation time, adds the hardware simulation time to the first simulation time to set the first simulation time ahead by the hardware simulation time, acquires the software simulation time whenever the software model notifies the software simulation time and adds the software simulation time to the second simulation time to set the second simulation time ahead by the software simulation time;

an execution instruction unit that compares the first simulation time with the second simulation time, instructs the software model execution unit to execute the software model when the first simulation time is later than the second simulation time, and instructs the hardware model execution unit to execute the hardware model when the second simulation time is later than the first simulation time; and an interrupt management unit that stores information that indicates whether or not an interrupt notification by the hardware model to the software model exists at present, wherein the execution instruction unit queries the interrupt management unit whether or not the interrupt notification exists, instructs the software model execution unit to execute an interrupt handler of the software model when the interrupt notification exists, instructs the software model execution unit to execute a task of the software model when the interrupt notification does not exist, instructs, when the software model awaits an interrupt from the hardware model, the hardware model execution unit to execute only the hardware model instead of execution of an idle loop of the software model until the interrupt from the hardware model occurs, and sets the second simulation time ahead to the first simulation time when the interrupt from the hardware model occurs to reduce a simulation time in an idling state.

2. The simulation apparatus according to claim 1, wherein, as a function of the software model being paused until the interrupt from the hardware model is received and when a hardware model which should be executed at the first simulation time does not exist, the execution instruction unit sets the first simulation time ahead to a nearest time at which the hardware model should be executed and instructs the hardware model execution unit to execute the hardware model.

3. A simulation method of managing a simulation time which indicates an elapsed time for executing processing by a verification target when the verification target performs hardware processing and software processing, and reproducing an execution timing of each processing by the verification target, the method comprising:

executing a hardware model that simulates processing of hardware installed in the verification target and notifies of a hardware simulation time indicating an elapsed time for processing by the hardware model;

executing a software model that simulates processing of software installed in the verification target and notifies of a software simulation time indicating an elapsed time for processing by the software model;

storing a first simulation time indicating a total elapsed time of the hardware simulation time and a second simulation time indicating a total elapsed time of the software simulation time in a storage device, acquiring the hardware simulation time whenever the hardware model notifies the hardware simulation time, adds the hardware simulation time to the first simulation time to set the first simulation time ahead by the hardware simulation time, acquiring the software simulation time whenever the software model notifies the software simulation time and adds the software simulation time to the second simulation time to set the second simulation time ahead by the software simulation time;

comparing the first simulation time with the second simulation time, causing the software model to be executed when the first simulation time is later than the second simulation time, and causing the hardware model to be executed when the second simulation time is later than the first simulation time;

querying, in order that the software model is executed, an interrupt management unit storing information that indicates whether or not an interrupt notification by the hardware model to the software model exists at present, causing an interrupt handler of the software model to be executed when the interrupt notification exists, and causing a task of the software model to be executed when the interrupt notification does not exist; and when the software model awaits an interrupt from the hardware model, causing only the hardware model to be executed instead of execution of an idle loop of the software model until the interrupt from the hardware model occurs, and setting the second simulation time ahead to the first simulation time when the interrupt from the hardware model occurs to reduce a simulation time in an idling state.

4. The method according to claim 3, further comprising:

as a function of the software model being paused until the interrupt from the hardware model is received and when a hardware model which should be executed at the first simulation time does not exist, setting the first simulation time ahead to a nearest time at which the hardware model should be executed and causing the hardware model to be executed.

5. A simulation apparatus that manages a simulation time which indicates an elapsed time for executing processing by a verification target when the verification target performs hardware processing and software processing, and reproduces an execution timing of each processing by the verification target, the simulation apparatus comprising:

a hardware model execution unit that executes a hardware model that simulates processing of hardware installed in the verification target and notifies of a hardware simulation time indicating an elapsed time for processing by the hardware model;

a software model execution unit that executes a software model that simulates processing of software installed in the verification target and notifies of a software simulation time indicating an elapsed time for processing by the software model;

a simulation time management unit that stores a first simulation time indicating a total elapsed time of the hardware simulation time and a second simulation time indicating a total elapsed time of the software simulation time, acquires the hardware simulation time whenever the hardware model notifies the hardware simulation time, adds the hardware simulation time to the first simulation time to set the first simulation time ahead by the hardware simulation time, acquires the software simulation time whenever the software model notifies the software simulation time and adds the software simulation time to the second simulation time to set the second simulation time ahead by the software simulation time;

an execution instruction unit that compares the first simulation time with the second simulation time, instructs the software model execution unit to execute the software model when the first simulation time is later than the second simulation time, and instructs the hardware model execution unit to execute the hardware model when the second simulation time is later than the first simulation time; and an interrupt management unit that stores information that indicates whether or not an interrupt notification by the hardware model to the software model exists at present;

an outside model that is a program that performs input/output processing with a device connected to the simulation apparatus and communicates with a simulation engine, the outside model being directly executed by a CPU of the simulation apparatus; and an outside model communication control unit that controls one-way communication or bidirectional communication between the hardware model and the outside model, wherein the execution instruction unit queries the interrupt management unit whether or not the interrupt notification exists, instructs the software model execution unit to execute an interrupt handler of the software model when the interrupt notification exists, instructs the software model execution unit to execute a task of the software model when the interrupt notification does not exist, instructs, as a function of the software model being paused until an interrupt from the hardware model is received and an executable hardware model exists, the hardware model execution unit to execute only the executable hardware model instead of execution of an idle loop of the software model until the interrupt from the hardware model occurs, instructs, as a function of the software model being paused unit an interrupt from the hardware model is received and an executable hardware model does not exist, the software model execution unit to execute the idle loop until the hardware model becomes executable, instructs, as a function of the hardware model being executable, the hardware model execution unit to execute only the executable hardware model instead of execution of the idle loop of the software model, and sets the second simulation time ahead of the first simulation time when the interrupt from the hardware model occurs to reduce a simulation time in an idling state.

* * * * *